US012744258B2

(12) United States Patent
Liu

(10) Patent No.: US 12,744,258 B2
(45) Date of Patent: Sep. 22, 2026

(54) POWER TOOL AND DISCHARGING SYSTEM

(71) Applicant: JIANGSU DONGCHENG TOOLS TECHNOLOGY CO., LTD, Nantong (CN)

(72) Inventor: Minming Liu, Nantong (CN)

(73) Assignee: JIANGSU DONGCHENG TOOLS TECHNOLOGY CO., LTD, Nantong (CN)

( * ) Notice: Subject to any disclaimer, the term of this patent is extended or adjusted under 35 U.S.C. 154(b) by 82 days.

(21) Appl. No.: 18/837,678

(22) PCT Filed: Jun. 29, 2023

(86) PCT No.: PCT/CN2023/103605
§ 371 (c)(1),
(2) Date: Aug. 12, 2024

(87) PCT Pub. No.: WO2024/093303
PCT Pub. Date: May 10, 2024

(65) Prior Publication Data

US 2025/0149657 A1 May 8, 2025

(30) Foreign Application Priority Data

Oct. 31, 2022 (CN) ........................ 202211343648.X

(51) Int. Cl.
*H02J 105/40* (2026.01)
*B25F 5/00* (2006.01)
(Continued)

(52) U.S. Cl.
CPC ....... *H01M 10/425* (2013.01); *H01M 10/486* (2013.01); *H01M 50/247* (2021.01);
(Continued)

(58) Field of Classification Search
CPC ............. H01M 10/425; H01M 10/486; H01M 50/247; H01M 50/296; H01M 2220/30;
(Continued)

(56) References Cited

U.S. PATENT DOCUMENTS

2011/0000689 A1* 1/2011 Funabashi ........... H01M 10/425 173/2
2011/0037435 A1 2/2011 Funabashi et al.
2020/0127339 A1* 4/2020 Nakano ................. H01M 10/44

FOREIGN PATENT DOCUMENTS

CN 101656415 A 2/2010
CN 101662048 B 10/2011
(Continued)

*Primary Examiner* — Rexford N Barnie
*Assistant Examiner* — Swarna N Chowdhuri
(74) *Attorney, Agent, or Firm* — ScienBiziP, P.C.

(57) ABSTRACT

Disclosed in the present application are a power tool and a discharging system. A battery pack includes a first positive terminal, a first negative terminal, a first controller, and a first state detection terminal. The power tool includes a second positive terminal, a second negative terminal, a second controller, a power supply module for supplying power to the second controller, and a power-on module connected to the power supply module. When the battery pack is connected to the power tool by insertion, the power-on module is connected to the first state detection terminal; and the first state detection terminal controls on/off of the power-on module according to the state of the battery pack, so as to control whether to power on the power tool.

20 Claims, 3 Drawing Sheets

(51) Int. Cl.

| | |
|---|---|
| ***H01M 10/42*** | (2006.01) |
| ***H01M 10/48*** | (2006.01) |
| ***H01M 50/247*** | (2021.01) |
| ***H01M 50/296*** | (2021.01) |
| ***H02J 7/60*** | (2026.01) |
| ***H02J 7/80*** | (2026.01) |
| *B25F 5/02* | (2006.01) |
| *H02J 7/00* | (2006.01) |

(52) U.S. Cl.
CPC ............. *H01M 50/296* (2021.01); *B25F 5/02* (2013.01); *H01M 2220/30* (2013.01); *H02J 7/855* (2026.01)

(58) Field of Classification Search
CPC ....... B25F 5/02; H02J 7/0063; H02J 2310/20; H02J 7/0031; H25F 5/00
USPC .......................................................... 307/115
See application file for complete search history.

(56) References Cited

FOREIGN PATENT DOCUMENTS

| | | | | |
|---|---|---|---|---|
| CN | 110350262 | B | | 3/2021 |
| CN | 115911732 | A | | 4/2023 |
| JP | 2005-131770 | A | | 5/2005 |
| JP | 2012115958 | A | * | 6/2012 |
| WO | 2019002207 | A1 | | 1/2019 |

* cited by examiner

POWER TOOL AND DISCHARGING SYSTEM

FIELD

The present application relates to a power tool and a discharging system.

BACKGROUND

As the power demand of power tools becomes greater and greater, battery packs are used as an energy source for DC power tools, and the requirements for condition detection of the battery packs are becoming more and more demanding to avoid serious damage to the battery packs, existing power tools send the abnormal state of the battery pack to the power tool through a state detection terminal, a controller input terminal of the power tool receives the state and performs protection, and the usual protection is performed in the power tool, when the battery pack has an undervoltage abnormality, the battery pack needs to provide power to the power tool to implement the protection operation of the controller, the battery pack continues to consume power in the case of undervoltage, which cannot be protected in time and leads to the waste of power or damage to the battery pack.

Please refer to Chinese patent issued No. CN 101662048B announced on October 5, second positive terminal 2011, which discloses that a power module of a battery pack control unit is arranged in a tool, and the power module also provides power for the tool control unit, the battery pack needs to be assembled to the tool and a trigger switch is closed, in other words, when the battery pack is not assembled or the trigger switch is not closed, the electronic components in the battery pack do not work, thereby effectively avoiding unnecessary consumption of power in the battery pack, but the state indication terminal indicating the working state of the battery is connected to the tool control unit, in the event of an abnormality, it still needs to be protected by the tool control unit and cannot be protected in time.

Therefore, it is necessary to design a power tool and a discharging system with timely protection and power saving to solve the above problems.

SUMMARY

In view of the shortcomings of the prior art, the present application aims to provide a power tool and discharging system that protects timely and saves electricity, in order to solve the above problems.

The present application apply the following technical solutions to solve the existing problems: a discharging system includes a battery pack and a power tool, the battery pack includes a first positive terminal, a first negative terminal, a first controller and a first state detection terminal connected to the first controller, the power tool includes a second positive terminal and a second negative terminal; the second positive terminal and the second negative terminal are electrically in contact with the first positive terminal and the first negative terminal of the battery pack, respectively, wherein the power tool includes a second controller, a power supply module for supplying power to the second controller and a power-on module connected to the power supply module, the power-on module is connected to the first state detection terminal when the battery pack is assembled to the power tool, and the first state detection terminal controls on/off of the power-on module based on state of the battery pack to control whether the power tool is powered on.

Furthermore, the power-on module includes a second state detection terminal connected to the first state detection terminal, the second state detection terminal is connected to a first switch, the first switch is connected to a second switch, and the second switch is connected to the second positive terminal and the power supply module.

Furthermore, the power supply module includes a switch circuit and a voltage stabilizing circuit connected to the switch circuit.

Furthermore, the switch circuit includes a third switch and a fourth switch, a base of the third switch is connected to the second switch, a collector of the third switch is connected to an emitter of the fourth switch, a base of the fourth switch and the second positive terminal, and a collector of the fourth switch is connected to the voltage stabilizing circuit.

Furthermore, the power tool includes a trigger, and the trigger is disposed on the second positive terminal and located between the power supply module and the power-on module.

Furthermore, the first state detection terminal is connected to the first positive terminal, and the first state detection terminal comprises a protection switch connected to the first controller.

Furthermore, the first state detection terminal is connected to an output port of the first controller.

The present application also apply the following technical solutions to solve the existing problems: a power tool is detachably connected to a battery pack, the power tool includes a second positive terminal electrically connected to a first positive terminal of the battery pack, and a second negative terminal electrically connected to a first negative terminal of the battery pack; wherein the power tool includes a second controller, a power supply module configured to supply power to the second controller, and a power-on module connected to the power supply module, the power-on module is configured to control on/off of the power-on module according to state of the battery pack to control whether the power tool is powered on.

Furthermore, the power-on module includes a second state detection terminal, the second state detection terminal is connected to a first switch, the first switch is connected to a second switch, and the second switch is connected to the second positive terminal and the power supply module.

Furthermore, the power supply module includes a switch circuit and a voltage stabilizing circuit connected to the switch circuit.

Compared with the prior art, the present application has the following beneficial effects:

The power tool is provided with a second controller, a power supply module for supplying power to the second controller, and a power-on module connected to the power supply module, the power-on module is connected to the first state detection terminal of the battery pack when the battery pack is assembled to the power tool, the first state detection terminal controls the on/off of the power-on module according to the state of the battery pack, to control whether the power tool is powered on, the state detection terminal of the battery pack is directly connected to the power-on module of the power tool, and can control the power-on module to not be powered on when the battery pack is abnormal, the tool is not powered on, and abnormal protection can be performed in time and no loss will be generated after the battery pack is abnormal.

BRIEF DESCRIPTION OF THE DRAWINGS

The specific embodiments of the present application are described in further detail below in conjunction with the accompanying drawings.

Meaning of the reference numerals in the figures.

100, 100', battery pack; 101, 101', first positive terminal; 102, 102', first negative terminal; 103, 103', first controller; 104, 104', first state detection terminal; 105, 105', temperature sensor; 106, protection switch; 200, power tool; 201, second positive terminal; 202, second negative terminal; 203, second controller; 204, drive module; 205, sampling circuit; 206, trigger; 1, power supply module; 2, power-on module; 21, second state detection terminal; 22, first switch; 23, second switch; 24, third switch; 25, fourth switch; 26, second voltage stabilizing circuit.

DETAILED DESCRIPTION

The present application is described in further detail below in conjunction with the accompanying drawings and embodiments.

Figure 1:
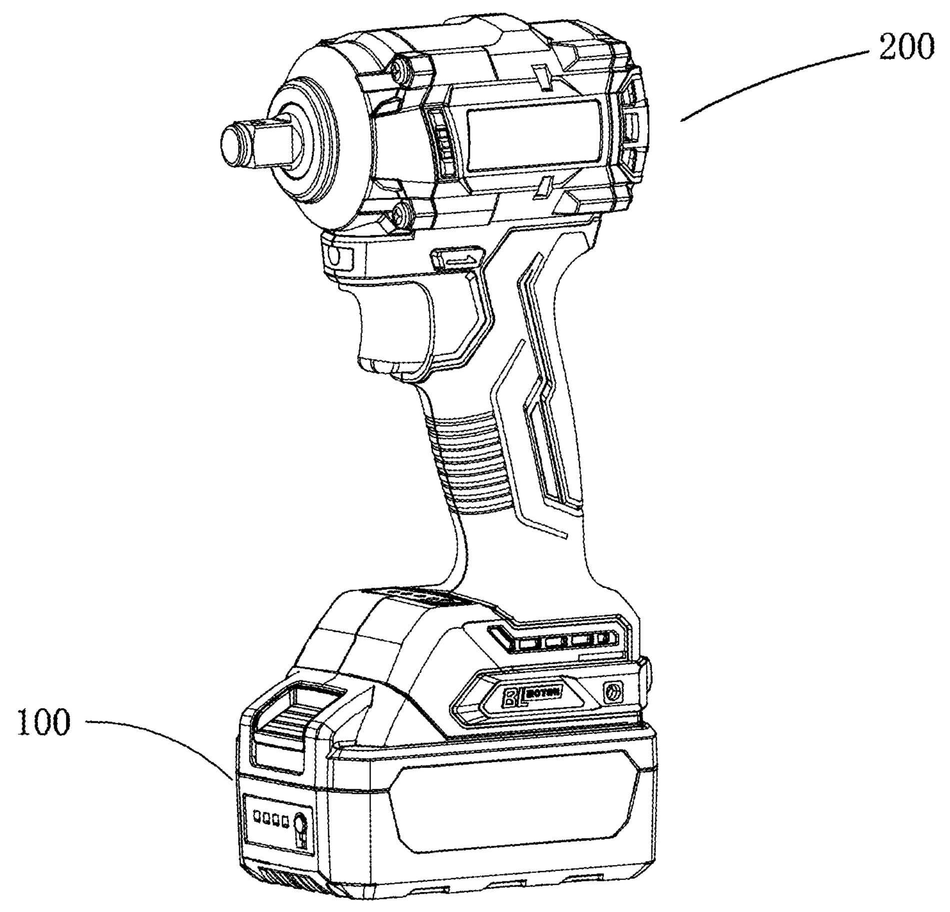
FIG. 1 is a three-dimensional view of a battery pack and a power tool according to the present application.

FIG. 1 illustrates a discharging system in accordance with an embodiment of the present application. The discharging system includes a battery pack 100 and a power tool 200, and the battery pack 100 can be detachably mounted to the power tool 200.

Figure 2:
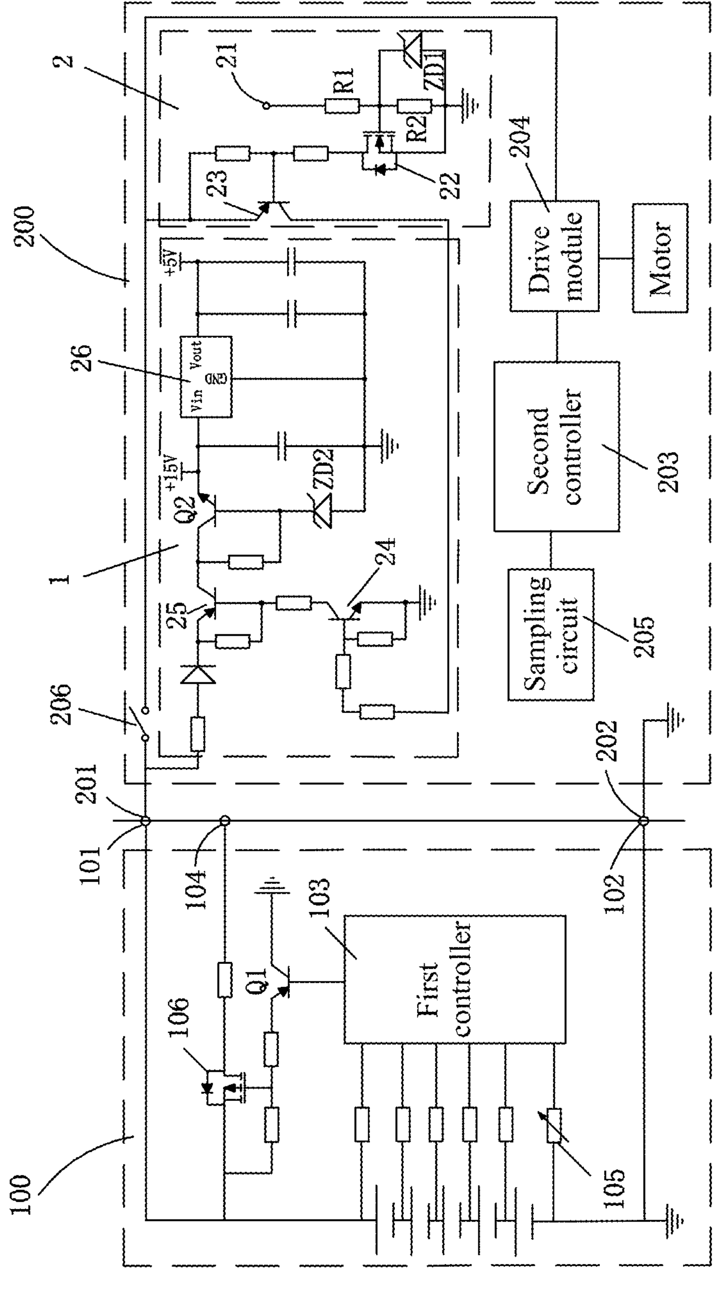
FIG. 2 is a circuit diagram of a battery pack and a power tool according to a first embodiment of the present application.

FIG. 2 illustrates a circuit diagram of the discharge system in accordance with a first embodiment of the present application, the battery pack 100 includes a battery cell, a first positive terminal 101, a first positive terminal 102, a first controller 103, a first state detection terminal 104 connected to the first controller 103, and a temperature sensor 105*a*, and the first controller 103 detects data such as the voltage of each battery cell and the temperature of the temperature sensor 105. The first state detection terminal 104 is connected to the first positive terminal 101, and the first state detection terminal 104 includes a protection switch 106 connected to the first controller 103, and the protection switch 106 is a MOS transistor, in other embodiments, the protection switch 106 can also be a triode, a source of the protection switch 106 is connected to the first positive terminal 101, a gate of the protection switch 106 is connected to a input terminal of the first controller 103 through a transistor Q1, and a drain of the protection switch 106 is connected to the first state detection terminal 104. The first controller 103 detects the state of the battery pack 100, if the battery pack 100 is determined to be normal based on the voltage of each battery cell and the temperature of the battery pack, the protection switch 106 can be turned on by controlling the transistor Q1 to be turned on, so that the first state detection terminal 104 is connected to the first positive terminal 101. If the battery pack 100 is abnormal, the protection switch 106 is turned off by controlling the transistor Q1 to be turned off, so that the first state detection terminal 104 is disconnected from the first positive terminal 101.

The power tool 200 includes a second positive terminal 201 and a second negative terminal 202, the second positive terminal and the second negative terminal are electrically contacted with the first positive terminal and the first negative terminal of the battery pack, respectively. The power tool 200 includes a second controller 203, a drive module 204 connected to the second controller 203, a power supply module 1 for supplying power to the second controller 203, and a power-on module 2 connected to the power supply module 1, the power-on module 2 is connected to the first state detection terminal 104 when the battery pack 100 is assembled to the power tool 200, the first state detection terminal 104 controls the on/off of the power-on module 2 according to the state of the battery pack 100 to control whether the power tool 200 is powered on.

The power-on module 2 includes a second state detection terminal 21 connected to the first state detection terminal 104, the second state detection terminal 21 is connected to a first switch 22, the first switch 22 is connected to a second switch 23, and the second switch 23 is connected to the second positive terminal 201 and the power supply module 1. More specifically, the first switch 22 is a MOS transistor, the second switch 23 is a triode, the second state detection terminal 21 is connected to the first switch 22 through a resistor, a resistor R1 and a resistor R2 are connected in series, the second state detection terminal 21 is connected to one end of the resistor R1, a connection point between the resistor R1 and the resistor R2 is connected to a gate of the first switch 22, a source of the first switch 22 is connected to another end of the resistor R2 and grounded, a voltage stabilizing tube ZD1 is connected in parallel at both ends of the resistor R2, a drain of the first switch 22 is connected to a base of the second switch 23, an emitter of the second switch 23 is connected to the second positive terminal 201, and a collector of the second switch 23 is connected to the power supply module 1.

The power supply module 1 includes a switch circuit and a voltage stabilizing circuit connected to the switch circuit. The switch circuit includes a third switch 24 and a fourth switch 25, the third switch 24 and the fourth switch 25 are triodes, a base of the third switch 24 is connected to the collector of the second switch 23, a collector of the third switch 24 is connected to an emitter of the fourth switch 25, a base of the fourth switch 25 and the second positive terminal 201, and the collector of the fourth switch 25 is connected to the voltage stabilizing circuit. The voltage stabilizing circuit includes a first voltage stabilizing circuit and a second voltage stabilizing circuit 26, the first voltage stabilizing circuit includes a transistor Q2 and a voltage stabilizing tube ZD2, a collector of the transistor Q2 is connected to the collector of the fourth switch 25, a base of the transistor Q2 is connected to the voltage stabilizing tube ZD2, an emitter of the transistor Q2 is connected to the second voltage stabilizing circuit 26, and the second voltage stabilizing circuit 26 is a voltage stabilizing chip. The power tool 200 also includes a sampling circuit 205, and the sampling circuit 205 includes a motor reverse electric detection circuit and a temperature detection circuit. The first voltage stabilizing circuit and the second voltage stabilizing circuit 26 can reduce the voltage of the battery into two different voltages, such as 15V and 5V, to supply power to the second controller 203 and the sampling circuit 205. In other embodiments, the first voltage stabilizing circuit can also be replaced by a voltage stabilizing chip, and the voltage output by the voltage stabilizing circuit is determined by a specific circuit. The power tool 200 also includes a trigger 206, the trigger 206 is disposed on the second positive terminal 201 and the trigger 206 is located between the power supply module 1 and the power-on module 2.

The specific discharge workflow includes: the battery pack 100 is assembled to the power tool 200, the first positive terminal 101 is connected to the second positive terminal 201, the first positive terminal 102 is connected to the second negative terminal 202, the battery pack 100 is powered on and the first controller 103 determines whether the voltage of each battery cell in the battery pack 100 is overcharged or over-discharged, and the temperature sensor 105 detects whether the battery pack 100 is overheated, if an abnormality occurs, the first controller 103 controls the transistor Q1 to be turned off, to turn off the protection switch 106. Therefore, the first state detection terminal 104 is disconnected from the first positive terminal 101, and the second state detection terminal 21 is not powered on, the first switch 22 and the second switch 23 are not turned on, therefore, the third switch 24 and the fourth switch 24 are not turned on, and power supply module 1 is not powered on, the second controller 203 and the sampling circuit 205 are not powered on, and the power tool 200 cannot be started. Through the power-on module 2, when an abnormality occurs in the battery pack 100, it can be directly reflected to the power tool 200, and the tool is directly not powered on, and protection can be achieved without the need for the power tool 200 to detect the state of the battery pack 100, which can avoid the battery pack 100 from generating an additional power loss, and prevent the battery pack 100 from being discharged unnecessarily or even damaged.

If the first controller 103 detects that there is no abnormality in the battery pack 100, the first controller 103 controls the transistor Q1 to be turned on, to turn on the protection switch 106, the first state detection terminal 104 is connected to the first positive terminal 101, and the second state detection terminal 21 can obtain the battery pack voltage through the first state detection terminal 104. The second state detection terminal 21, the resistor R1, the resistor R2, and the ground form a loop, and the voltage is stabilized at both ends of the resistor R2 by the voltage stabilizing tube ZD1, so that a voltage difference is formed between the source of the first switch 22 and the gate of the first switch 22, and the first switch 22 is turned on, if the trigger 206 is pressed, the second switch 23 is turned on, the second positive terminal 201 and the second switch 23 are powered on, the base of the third switch 24 is connected to the second positive terminal 201, the third switch 24 is turned on, and then the fourth switch 25 is turned on, the emitter of the fourth switch 25 is connected to the second positive terminal 201, the transistor Q2 and the voltage stabilizing chip are turned on, at this time, the first voltage stabilizing circuit stabilizes the battery pack voltage to 15V output, the second voltage stabilizing circuit 26 stabilizes the voltage of the first voltage stabilizing circuit to 5V output, the second controller 203 detects that the trigger 206 is closed, and controls the drive module 204 to drive the motor. The trigger 206 is disposed between the power supply module 1 and the power-on module 2, only when the battery pack 100 is normal and the trigger 206 is pressed, the power tool 200 will be powered on, thereby avoiding unnecessary loss of the battery pack 100 and saving energy.

Figure 3:
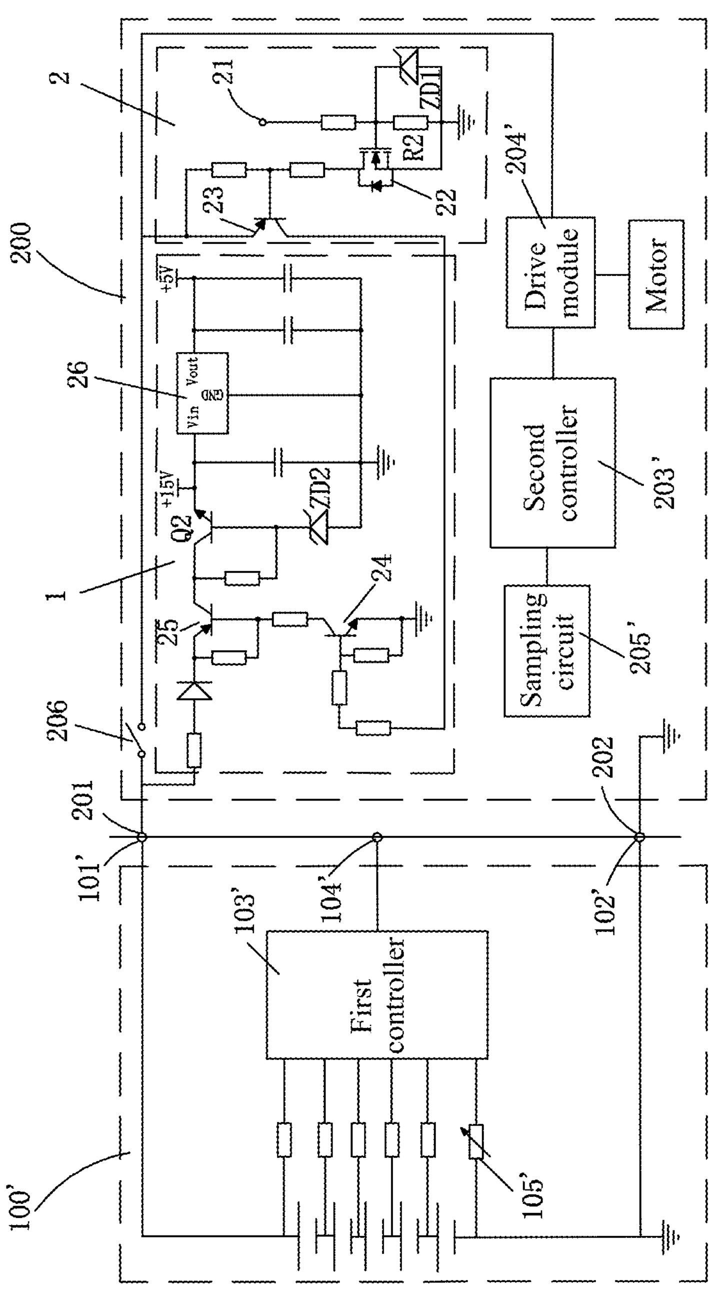
FIG. 3 is a circuit diagram of a battery pack and a power tool according to a second embodiment of the present application.

FIG. 3 illustrates a circuit diagram of the discharge system in accordance with a second embodiment of the present application, the battery pack 100' includes a battery cell, a first positive terminal 101', a first positive terminal 102', a first controller 103', a first state detection terminal 104' connected to the first controller 103', and a temperature sensor 105', the first controller 103' detects data such as the voltage of each battery cell and the temperature of the temperature sensor 105'. The first state detection terminal 104' is connected to the output port of the first controller 103', the first controller 103' detects the state of the battery pack 100', if the battery pack 100' is determined to be normal based on the voltage of each battery cell and the temperature of the battery pack 100', the first controller 103' outputs a high level through the first state detection terminal 104', and the high level is 5V in this embodiment; if the battery pack 100' is abnormal, the first controller 103' outputs a low level through the first state detection terminal 104', and the low level is 0V in this embodiment.

The power tool 200 has the same structure as the first embodiment, and the specific discharge workflow includes: the battery pack 100' is assembled to the power tool 200, the first positive terminal 101' is connected to the second positive terminal 201, the first positive terminal 102' is connected to the second negative terminal 202, the battery pack 100' is powered on and the battery pack 100' determines whether the voltage of each cell of the battery pack 100' is overcharged or over-discharged through the first controller 103', and detects whether the battery pack 100' is over-temperature through the temperature sensor 105'. If an abnormality occurs, the first controller 103' outputs a low level through the first state detection terminal 104', the second state detection terminal 21 is not powered on, the first switch 22 and the second switch 23 are not turned on, therefore, the third switch 24 and the fourth switch 25 are not turned on, the power supply module 1 is not powered on, the second controller 203 and the sampling circuit 205 are not powered on, and the power tool 200 cannot be started. Through the power-on module 2, when an abnormality occurs in the battery pack 100', it can be directly reflected to the power tool 200, and the tool is directly not powered on, and protection can be achieved without the need for the power tool 200 to detect the state of the battery pack 100', which can avoid the battery pack 100' from generating an additional power loss, and prevent the battery pack 100' from being discharged unnecessarily or even damaged.

If the first controller 103' detects that the battery pack 100' has no abnormality, the first controller 103' outputs a high level through the first state detection terminal 104', the second state detection terminal 21 has voltage, the second state detection terminal 21, the resistor R1, the resistor R2, and the ground form a loop, and the voltage is stabilized at both ends of the resistor R2 through the voltage stabilizing tube ZD1, so that a voltage difference is formed between the source of the first switch 22 and the gate of the first switch 22, the first switch 22 is turned on, and if the trigger 206 is pressed, the second switch second switch 23 is turned on, the second positive terminal 201 and the second switch 23 are powered on, the base of the third switch 24 is connected to the second positive terminal 201, the third switch 24 is turned on, and then the fourth switch 25 is turned on, the emitter of the fourth switch 25 is connected to the second positive terminal 201, the transistor Q2 and the voltage stabilizing chip are turned on, the first voltage stabilizing circuit stabilizes the battery pack voltage to 15V output, the second voltage stabilizing circuit 26 stabilizes the voltage of the first voltage stabilizing circuit to 5V output, the second controller 203 detects that the trigger 206 is closed, and controls the drive module 204 to drive the motor, the trigger 206 is disposed between the power supply module 1 and the power-on module 2, only when the battery pack 100 is normal and the trigger 206 is pressed, the power tool 200 will be powered on, thereby avoiding unnecessary loss of the battery pack 100 and saving energy.

The power tool 200 of the present application is provided with a second controller 203, a power supply module 1 for supplying power to the second controller 203, and a power-on module 2 connected to the power supply module 1, the power-on module 2 is connected to the first state detection terminal 104 of the battery pack 100 when the battery pack 100 is assembled to the power tool 200, the first state detection terminal 104 controls the on/off of the power-on module 2 according to the state of the battery pack 100, to control whether the power tool 200 is powered on, the state detection terminal of the battery pack 100 is directly connected to the power-on module 2 of the power tool 200, and can control the power-on module 2 to not be powered on when the battery pack 100 is abnormal, the tool is not powered on, and abnormal protection can be performed in time and no loss will be generated after the battery pack 100 is abnormal.

The present application is not limited to the above specific embodiments. A person skilled in the art can easily understand that there are many other alternatives to the power tool and discharging system of the present application without departing from the principle and scope of the present application. The protection scope of the present application shall be subject to the content of the claims.

The invention claimed is:

1. A discharging system comprising a battery pack and a power tool, wherein, the battery pack comprises a first positive terminal, a first negative terminal, a first controller and a first state detection terminal connected to the first controller; and the power tool comprises a second positive terminal and a second negative terminal; the second positive terminal and the second negative terminal are electrically in contact with the first positive terminal and the first negative terminal of the battery pack, respectively, wherein:

the power tool comprises a second controller, a power supply module for supplying power to the second controller and a power-on module connected to the power supply module, the power-on module is connected to the first state detection terminal when the battery pack is assembled to the power tool, and the first state detection terminal controls on/off of the power-on module based on a state of the battery pack to control whether the power tool is powered on;

wherein the power-on module comprises a second state detection terminal connected to the first state detection terminal, the second state detection terminal is connected to a first switch, the first switch is connected to a second switch, and the second switch is connected to the second positive terminal and the power supply module, the power supply module comprises a switch circuit, the switch circuit comprises a third switch and a fourth switch, and the third switch is connected to the second switch and the fourth switch; wherein when the battery pack is in an abnormal state, the first controller outputs a signal to the second state detection terminal through the first state detection terminal, to control the first switch and the second switch to be turned off and the third switch and the fourth switch to be turned off so that the power tool is not powered on.

2. The discharging system according to claim 1, wherein the power-on module and the first switch are disposed in the power tool.

3. The discharging system according to claim 2, wherein the power supply module comprises a voltage stabilizing circuit, and the switch circuit is connected to the voltage stabilizing circuit.

4. The discharging system according to claim 3, wherein a base of the third switch is connected to the second switch, a collector of the third switch is connected to an emitter of the fourth switch, a base of the fourth switch and the second positive terminal, and a collector of the fourth switch is connected to the voltage stabilizing circuit.

5. The discharging system according to claim 4, wherein the power tool comprises a trigger, and the trigger is disposed on the second positive terminal and located between the power supply module and the power-on module.

6. The discharging system according to claim 1, wherein the first state detection terminal is connected to the first positive terminal, and the first state detection terminal comprises a protection switch connected to the first controller.

7. The discharging system according to claim 1, wherein the first state detection terminal is connected to an output port of the first controller.

8. The discharging system according to claim 6, wherein a source of the protection switch is connected to the first positive terminal, a gate of the protection switch is connected to an input terminal of the first controller through a transistor, and a drain of the protection switch is connected to the first state detection terminal; and wherein the first controller is configured to detect state of the battery pack, and determine whether the battery pack is normal based on a voltage of each battery cell and a temperature of the battery pack.

9. The discharging system according to claim 8, wherein the first controller is configured to control the transistor to be turned on to turn on the protection switch when the battery pack is determined to be normal.

10. The discharging system according to claim 8, wherein the first controller is configured to control the transistor to be turned off to turn off the protection switch when the battery pack is determined to be abnormal.

11. The discharging system according to claim 2, wherein the second state detection terminal is connected to a first end of a second resistor through a first resistor, a second end of the second resistor is grounded, and a connection node between the first resistor and the second resistor is connected to a gate of the first switch, a source of the first switch is connected to the second end of the second resistor, two ends of the second resistor are connected in parallel with a voltage stabilizing tube, a drain of the first switch is connected to a base of the second switch, and an emitter of the second switch is connected to the second positive terminal, and a collector of the second switch is connected to the power supply module; and wherein the voltage stabilizing tube is configured to stabilize a voltage at both ends of the second resistor, to generate a voltage difference between the source of the first switch and the gate of the first switch.

12. The power tool according to claim 4, wherein the voltage stabilizing circuit comprises a first voltage stabilizing circuit and a second voltage stabilizing circuit, the first voltage stabilizing circuit comprises a transistor and a voltage stabilizing tube, a collector of the transistor is connected to the collector of the fourth switch, a base of the transistor is connected to the voltage stabilizing tube, and an emitter of the transistor is connected to the second voltage stabilizing circuit.

13. A power tool detachably connected to a battery pack, the power tool comprising a second positive terminal electrically connected to a first positive terminal of the battery pack, and a second negative terminal electrically connected to a first negative terminal of the battery pack; wherein the power tool comprises:

a second controller;

a power supply module configured to supply power to the second controller;

a power-on module connected to the power supply module, and configured to control on/off of the power-on module according to a state of the battery pack to control whether the power tool is powered on;

wherein the power-on module comprises a second state detection terminal connected to the first state detection terminal, the second state detection terminal is connected to a first switch, the first switch is connected to a second switch, and the second switch is connected to the second positive terminal and the power supply module, the power supply module comprises a switch circuit, the switch circuit comprises a third switch and a fourth switch, and the third switch is connected to the second switch and the fourth switch; and wherein when the battery pack is in an abnormal state, the second state detection terminal receives a signal outputted by a first controller of the battery pack through the first state detection terminal, to control the first switch and the second switch to be turned off and the third switch and the fourth switch to be turned off, so that the power tool is not powered on.

14. The power tool according to claim 13, wherein the power-on module and the first switch are disposed in the power tool.

15. The power tool according to claim 14, wherein the power supply module comprises a voltage stabilizing circuit, and the switch circuit is connected to the voltage stabilizing circuit.

16. The power tool according to claim 15, wherein a base of the third switch is connected to the second switch, a collector of the third switch is connected to an emitter of the fourth switch, a base of the fourth switch and the second positive terminal, and a collector of the fourth switch is connected to the voltage stabilizing circuit.

17. The power tool according to claim 16, wherein the power tool comprises a trigger, and the trigger is disposed on the second positive terminal and located between the power supply module and the power-on module.

18. The power tool according to claim 14, wherein the second state detection terminal is connected to a first end of a second resistor through a first resistor, a second end of the second resistor is grounded, and a connection node between the first resistor and the second resistor is connected to a gate of the first switch, a source of the first switch is connected to the second end of the second resistor, two ends of the second resistor are connected in parallel with a voltage stabilizing tube, a drain of the first switch is connected to a base of the second switch, and an emitter of the second switch is connected to the second positive terminal, and a collector of the second switch is connected to the power supply module; and wherein the voltage stabilizing tube is configured to stabilize a voltage at both ends of the second resistor, to generate a voltage difference between the source of the first switch and the gate of the first switch.

19. The power tool according to claim 16, wherein the voltage stabilizing circuit comprises a first voltage stabilizing circuit and a second voltage stabilizing circuit, the first voltage stabilizing circuit comprises a transistor and a voltage stabilizing tube, a collector of the transistor is connected to the collector of the fourth switch, a base of the transistor is connected to the voltage stabilizing tube, and an emitter of the transistor is connected to the second voltage stabilizing circuit.

20. The power tool according to claim 19, wherein the second voltage stabilizing circuit is a voltage stabilizing chip.

* * * * *